United States Patent [19]

Sindeband et al.

[11] Patent Number: 4,973,800
[45] Date of Patent: Nov. 27, 1990

[54] APPARATUS FOR DIGITIZING POSITIONS ON A TRANSPARENCY

[75] Inventors: Seymour J. Sindeband, Pound Ridge, N.Y.; Harold Terk, Stamford, Conn.

[73] Assignee: Science Accessories Corp., Stratford, Conn.

[21] Appl. No.: 284,544

[22] Filed: Dec. 15, 1988

[51] Int. Cl.$^5$ .............................................. G08C 21/00
[52] U.S. Cl. ...................................... 178/18; 367/907; 362/33
[58] Field of Search ..................... 178/18, 19; 367/118, 367/907; 362/33, 84, 97, 367, 373, 375

[56] References Cited

U.S. PATENT DOCUMENTS

| | | | |
|---|---|---|---|
| 3,868,501 | 2/1975 | Barbour | 240/10 |
| 4,071,883 | 1/1978 | Dennis | 362/97 |
| 4,074,452 | 2/1978 | Bellinder | 40/571 |
| 4,078,850 | 3/1978 | Chaban | 350/36 |
| 4,083,061 | 4/1978 | Barrows | 354/307 |
| 4,149,083 | 4/1979 | Suys et al. | 250/486 |
| 4,164,822 | 8/1979 | Batton | 40/361 |
| 4,184,194 | 1/1980 | Shofu | 362/97 |
| 4,242,821 | 1/1981 | McNeil | 40/571 |
| 4,255,045 | 3/1981 | Eisenberg | 355/37 |
| 4,260,220 | 4/1981 | Whitehead | 350/96 |
| 4,343,033 | 8/1982 | Suzuki | 362/307 |
| 4,357,672 | 11/1982 | Howells et al. | 364/561 |
| 4,404,619 | 9/1983 | Ferguson | 362/222 |
| 4,418,378 | 11/1983 | Johnson | 362/97 |
| 4,451,698 | 5/1984 | Whetstone et al. | 178/19 |
| 4,467,727 | 8/1984 | Strommer | 108/23 |
| 4,490,776 | 12/1984 | Kluch | 362/16 |
| 4,511,953 | 4/1985 | Fage | 362/230 |
| 4,542,449 | 9/1985 | Whitehead | 362/330 |
| 4,555,621 | 11/1985 | Buchar | 250/205 |
| 4,564,886 | 1/1986 | Morcheles | 362/97 |
| 4,587,754 | 5/1986 | Ossner | 40/564 |
| 4,615,579 | 10/1986 | Whitehead | 350/96 |
| 4,641,442 | 2/1987 | Filmer | 40/219 |
| 4,649,462 | 3/1987 | Dobrowolski et al. | 362/2 |
| 4,669,031 | 5/1987 | Regester | 362/16 |
| 4,704,004 | 11/1987 | Nosker | 350/345 |
| 4,735,495 | 4/1988 | Henkes | 350/345 |
| 4,743,759 | 5/1988 | Boutet | 250/327 |
| 4,750,798 | 6/1988 | Whitehead | 350/96 |
| 4,751,434 | 6/1988 | Helling et al. | 315/183 |
| 4,791,540 | 12/1988 | Dreyer et al. | 362/97 X |

OTHER PUBLICATIONS

Scotch Brand Optical Lighting Film-Application Bulletin #1, 1/1/88, pp. 1-8.
Scotch Brand Optical Lighting Film-Theory of Operation; 1/1/88, pp. 1-5.
Scotchlamp Film, pp. 1-12.
3M-"One Bulb—", pp. 1-4.
Piping Light, Popular Science, May, 1988.

*Primary Examiner*—Stafford D. Schreyer
*Attorney, Agent, or Firm*—Martin M. Novack

[57] ABSTRACT

An apparatus is disclosed for digitizing positions on a transparency. The apparatus includes a cool light box and an acoustic digitizer.

17 Claims, 3 Drawing Sheets

APPARATUS FOR DIGITIZING POSITIONS ON A TRANSPARENCY

BACKGROUND OF THE INVENTION

This invention relates to primarily to an improved apparatus for digitizing of positions on a transparency, such as an X-ray or photographic film.

In various applications a digitizer can be utilized in conjunction with a light box to determine the positions of selected points on a transparency that is illuminated by the light box. For example, in one commonly used application, a light box is used to illuminate a transparency containing columns of DNA or RNA sequence information on X-ray film that is obtained from electrophoretic processing of proteins or other biological substances. A digitizer is positioned to have a working region (i.e., a region within which coordinate locations of selected points can be obtained, typically in digital form) over the illuminated surface of a light box on which the transparency is placed. An operator uses a stylus, or other marker of the digitizer equipment, to mark the location of points on the transparency, typically in a selected sequence. The coordinate locations of the marked points are determined by the digitizer equipment, and are usually stored under control of a digital computer or other electronic data processor.

A type of digitizer that is useful in applications like the one described is an acoustic digitizer of the type manufactured and sold by the assignee of the present patent application, Science Accessories Corporation, of Southport, Conn. an acoustic digitizer, acoustic wave pulses are typically emitted from the stylus of the digitizer equipment, travel through the air, and are detected at known locations. The transit time of the ultrasound energy in traveling from the stylus to the known locations can be utilized to compute the coordinates of the stylus location. Conversely, if desired, the acoustic waves can be generated at a known location or locations, and either be received by the stylus or bounced off a passive stylus or a finger to receivers, in order to determine the stylus location.

An advantage of the described type of digitizer is that it does not require wires or other opaque or semi-opaque media in the working region that could block light needed for the operator to clearly see what is to be marked. Also, there is no need to make contact with a surface below the item being digitized. Alternatively, sound transmission could be through a transparent solid medium, although this is considered less advantageous in that the medium would have to be positioned over the transparency.

Notwithstanding the stated advantage of utilizing an acoustic digitizer, an existing drawback is the temperature sensitivity of acoustic digitizer measurements, since coordinate locations are determined from transit times through media (typically air, but also possibly solid transparent media), and the speed of sound or ultrasound through such media varies substantially with temperature.

In applications where an acoustic digitizer is utilized for position determination on transparencies which are illuminated by a light box, the heat from the light box can cause inaccuracies and inconsistencies, and can contribute to user discomfort. Although techniques could be employed for electronically compensating for temperature variations in digitizer readings, such techniques can involve additional expense and/or complication of equipment, and may not provide complete solution to the problem.

It is among the objects of the present invention to provide solution to the described disadvantages in the prior art.

SUMMARY OF THE INVENTION

The present invention is directed to an improved apparatus for digitizing positions on a transparency. As used herein, the term "transparency" is intended in a nonlimitinq sense to include any and all media which can be advantageously viewed by passing light through the media, for example, an X-ray film, a DNA sequence chromatograph, etc. A light box, which includes a light generating subsystem and a light presenting subsystem, is provided. The light presenting subsystem includes means for receiving the light generated by the light generating subsystem, and has a translucent top working surface on which the transparency can be disposed. The light presenting subsystem also includes means for distributing the received light such that it is emitted substantially uniformly from said top working surface. Means are provided for thermally insulating the light presenting subsystem from the light generating subsystem to reduce heating of the working surface by the light generating subsystem. An acoustic digitizer is mounted in conjunction with the light box, and has a digitizing area over the working surface. The acoustic digitizer comprises an element movable in the region above the working surface and means for determining the position of the movable element by measuring the travel time of acoustic energy between the movable element and known locations.

In a preferred embodiment of the invention, the light presenting subsystem comprises a sealed enclosure having a transparent window for receiving light from the light generating subsystem, and total internal reflection material in the enclosure for appropriately distributing light within the enclosure. In one embodiment, the light generating subsystem comprises a housing containing lamps, the housing having an opened side which faces and is spaced from the transparent window of the light presenting means. This results in an air space between the light generating subsystems and the light presenting subsystem. This air space serves to insulate the sealed enclosure of the light presenting subsystem from heat generated by the light generating subsystem, and it also permits the venting of heat from the housing of the light generating subsystem. In another embodiment, a plastic spacer is used for insulation, and the light generating subsystem is separately vented. This means that the light presenting subsystem, and its top working surface, will remain relatively cool, and will not generate substantial heat in the digitizing area that could interfere with accurate and consistent operation of the digitizer.

Further features and advantages of the invention will become more readily apparent from the following detailed description when in conjunction with the accompanying drawings.

DESCRIPTION OF THE PREFERRED EMBODIMENT

Figure 1:
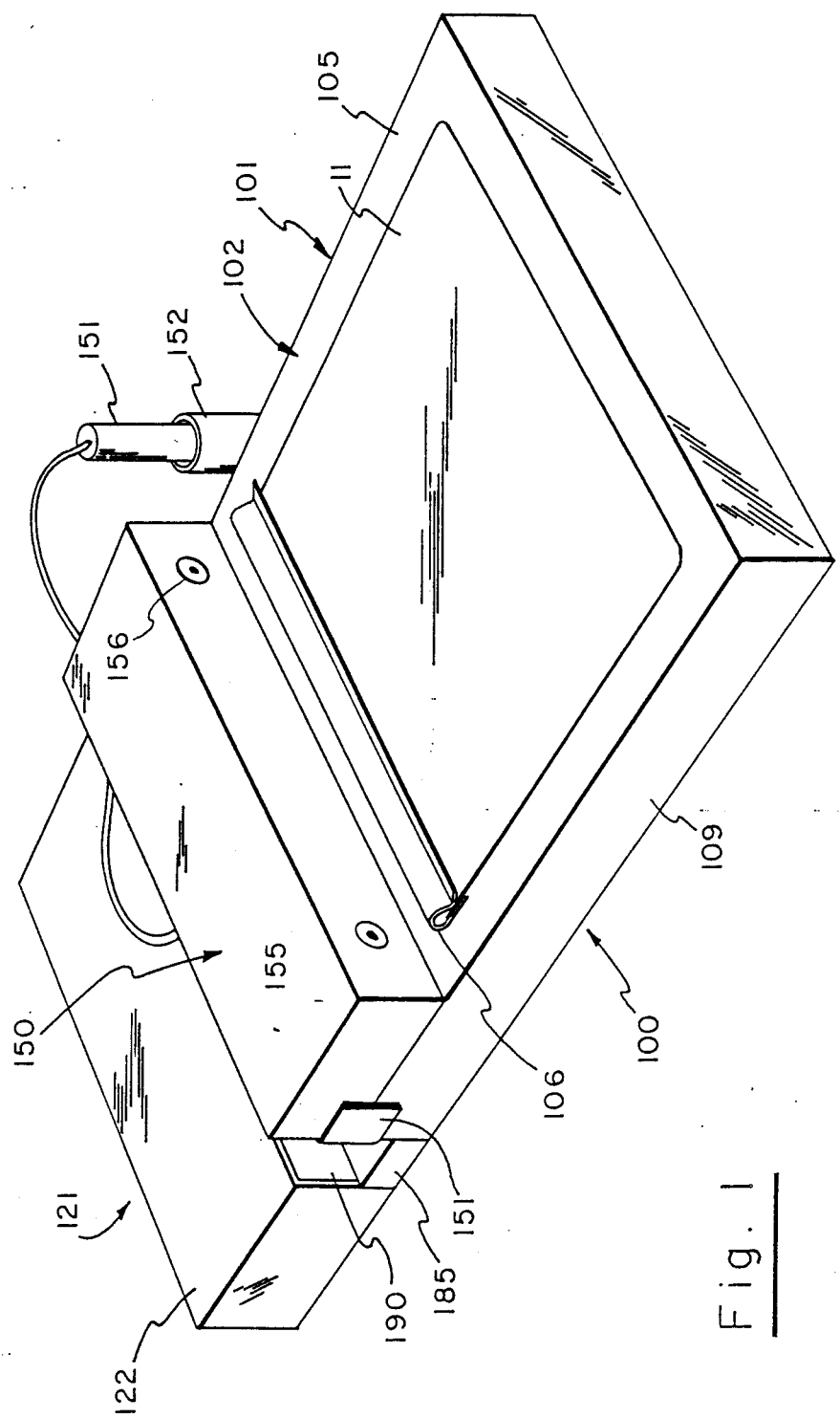
FIG. 1 is an elevational perspective view of an apparatus in accordance with an embodiment of the invention, with FIGS. 2B and 2C respectively showing enlarged views of the broken away portions of the top and bottom portion of the FIG. 2A view.

Referring to FIG. 1, there is shown a diagram of a system for digitizing positions on a transparency in accordance with an embodiment of the invention. A light box 100 is provided, and has a top working surface 105 which is illuminated substantially uniformly, in a manner to be described. A transparency 11 can be disposed on the top working surface of the light box for viewing and for digitizing of selected positions on the transparency. In the illustrated embodiment, a clamp 106 is mounted on the top working surface of the light box, and establishes a reference position at which a transparency can be mounted on the working surface. However, it will be understood that any desired means for establishing a reference position on the working surface can be utilized. A reference position or line, which is at a known location with respect to a digitizer subsystem 150, can be useful for certain applications, although it will be understood that the relative position of points within the working area can be obtained and used without the need for pre-established reference positions.

In the illustrated embodiment, an acoustic digitizer subsystem 150 is employed, and is mounted on the top surface of the light box 100, such as by using corner brackets 151, one of which is visible in FIG. 1. As used herein, the term "acoustic digitizer" is intended to include any equipment that utilizes acoustic energy (including sound energy, ultrasound energy, and any sound-like energy) for position determination by measurement of propagation time of said energy traveling to and/or from a moveable element whose position is to be digitized. Preferably, such propagation is through the air, although it may alternatively be through a solid medium such as a glass or plastic transparent tablet disposed over the working surface. In the illustrated embodiment, the digitizer is a model "Graf/Bar", manufactured and sold by Science Accessories, Corporation of Southport, Conn., the assignee hereof. This equipment includes a stylus 151 (shown in its holder, 152) which is connected by a wire to the rest of subsystem 150 and is movable over the working surface. The stylus includes, near its tip, a source of acoustic energy, for example a sparking source or other transducer which can be initiated under operator control, such as by activating a switch in the stylus tip. A pair of point microphones 155 and 156 receive the acoustic energy transmitted from the stylus tip. Elongated microphones could alternatively be employed. Briefly, in operation of the described type of digitizer, the generation of acoustic energy at the stylus tip starts clocks running in conjunction with each of the point microphone receivers, and these clocks are respectively stopped when the acoustic energy is first received at the respective point microphones. The resultant counts respectively represent the distance from the stylus to each of the point microphones, and the coordinate position of the stylus can then be computed, in known manner, using trigonometric relationships. Reference can be made, for example, to U.S. Pat. No. 4,375,672 for further description of this type of digitizer.

In the described type of digitizer the temperature of the air will affect transit time, and temperature variations (including localized thermal eddies) can introduce errors in position determination. It is known that temperature compensation techniques can be utilized to reduce these errors, but can add complication, cost, unreliability, and/or inconvenience and, as previously noted, it is among the objects of the present invention to remove undesirable heating of the digitizing area by the light box.

Referring now also to FIGS. 2A, 2B and 2C, there are shown further details of the light box 100 of the FIG. 1 embodiment. The light box includes a light generating subsystem 121 and a light presenting subsystem 101 which receives light from the light generating subsystem and directs the light such that it is emitted substantially uniformly from the top working surface 105 thereof. The light generating subsystem 121 comprises a generally rectangular plastic enclosure or housing 122 which is opened at one end, and is mirrored inside its other surfaces. [The side thereof facing the viewer is removed in this illustration.] The housing may alternatively be of a metal construction. The light generating subsystem includes one or more light sources such as fluorescent lamps 126 and 127, and can also contain suitable supports, sockets, ballast and wiring (not shown) for coupling the stated elements and for connection to appropriate energizing means. These are all well known in the art. In the present embodiment, the light leaves the light generating subsystem through the open side 124 of the housing 122.

Figure 2:
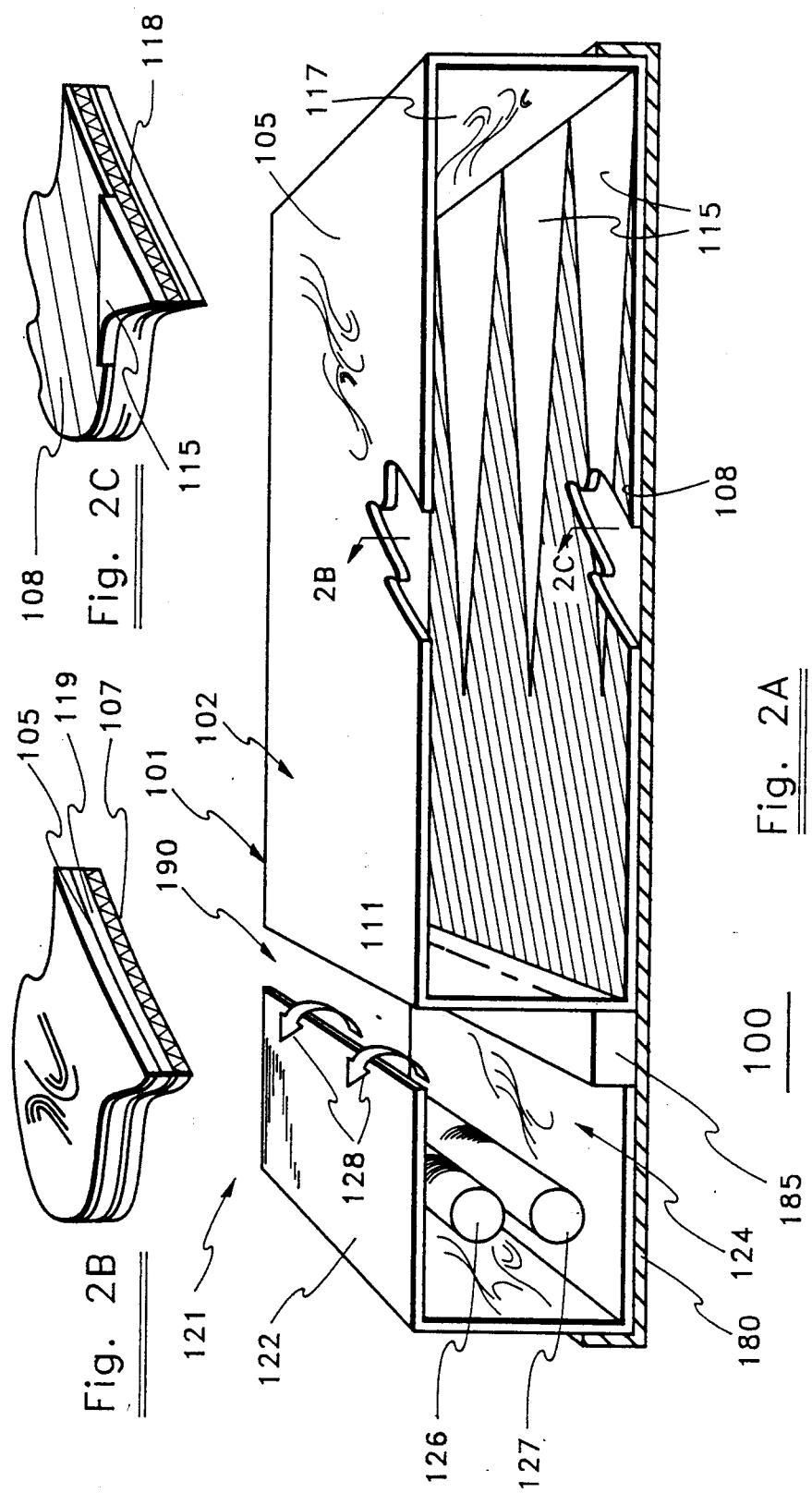
FIGS. 2A, 2B and 2C show a partially broken-away view of the light box of FIG. 1 in accordance with an embodiment of the invention with FIGS. 2B and 2C showing enlargement of the portion indicated by arrows 2B and 2C, respectively.

The light presenting subsystem 101 comprises a generally rectangular air sealed enclosure 102. In the present embodiment, the housing 122 is formed of a clear rigid plastic which has specified materials on its inner surfaces, although other construction materials and methods can be utilized. The end 111 is left clear to be a transparent window for receiving the light from the light generating subsystem 121. At least the top and bottom inner surfaces of enclosure 102 have disposed thereon a light piping material which operates as a so-called "total internal reflection" material in that it provides substantially total reflection of light which strikes the material at less than a specified angle. This material is described, for example, in an article entitled "Piping Light" which appeared in the May, 1988 issue of Popular Science. The material is a flexible plastic film that is smooth on one side and has a multiplicity of elongated small parallel prisms on the other side. The material is sold by 3M Corp. as Scotch Lamp Optical Lighting Film. As is known in the art, this optical lighting film can be utilized for piping light from one place to another, and for emitting some of the light in a desired way by controlling the angles at which some of the light impinges on the material. In particular, in the embodiment of FIG. 1, the total internal reflection material 107 on the top inner surface of the enclosure 101 is arranged with its multiple prism side facing the outside of the enclosure and its smooth side facing the inside of the enclosure (see FIG. 2B). The total internal reflection material 108 on the bottom inner surface of the enclosure is also arranged with its smooth side facing the inside of the enclosure and its multiple prism side facing the outside of the enclosure, as seen in FIG. 2. The sides of the enclosure (see e.g. reference numeral 109 in FIG. 1) can also have total internal reflection material thereon or can have any suitable reflective surface. Triangular-shaped strips 115 of a so-called "light extraction" film are provided on the bottom inner surface of the enclosure, and can either overlay the total internal reflection material 108, or the total reflection material 108 can be cut into a shape to accommodate the light extraction film. As seen in FIG. 2A, the strips of light extraction film gradually increase in width as they approach the far end of the enclosure. The light extraction film may be, for example, Scotch Brand Light Extraction Film, available from 3M Corp. The light extraction film, in the illustrated configuration, reflects some of the light striking the bottom surface and by changing the angle of reflection affects the amount of light that escapes through the top surface in a way that enhances uniformity of light emitted from said top surface. The use of optical lighting film and light extraction film as employed herein is described, for example, in advertising literature from 3 Corp. entitled "Scotch Brand Optical Lighting Film, Application Bulletin No. 1", Jan. 1, 1988.

In the disclosed embodiment, and as seen in the enlargements of FIGS. 2B and 2C, a matte white paint 118 is applied to the inner bottom surface of the enclosure before application of the total internal reflection material, and a light diffusing material 119, such as a white paint or vinyl is applied to the inner surface of the top working surface 105 of the enclosure 102 before application of the total reflection material thereto. The inner surface 117 of the far end of the enclosure is provided with a mirror surface coating such as a mylar film.

In operation, the optical lighting film on the top surface is oriented so as to permit controlled leakage of light to the top working surface 105, and the layer 119 acts to diffuse this light. The light will be substantially evenly distributed by virtue of the light extraction film strips 115 on the bottom surface, which operate to diffuse some of the light that would otherwise be reflected by film 108 so that it strikes the top surface optical lighting film at angles which permit the escape of light through said film (see e.g. the 3M literature, referred to above). In this manner, light will be substantially uniformly emitted from the top working surface 105. Other configurations of light extraction material can also be used.

In the illustrated embodiment, the light generating subsystem 121 and the light presenting subsystem 101 are mounted in a rectangularly shaped base 180 (shown in FIG. 2A) which may be formed, for example, of metal or a rigid plastic. A separator panel 185, which may be formed, for example, of plastic, is secured to the base 180 and defines the positions of the two subsystems. As seen in FIG. 2A, there is an air space 190 between the light generating subsystem and the light presenting subsystem. This air space serves to insulate the sealed enclosure 102 of the light presenting subsystem from heat generated by the light generating subsystem 121, and it also permits the venting of heat from the housing of light generating subsystem 121, as indicated by the arrows 128 in FIG. 2A. This means that the light presenting subsystem, and its top working surface 105, will remain relatively cool, and will not generate substantial heat in the digitizing area that could interfere with accurate and consistent operation of the digitizer, as described above.

Figure 3:
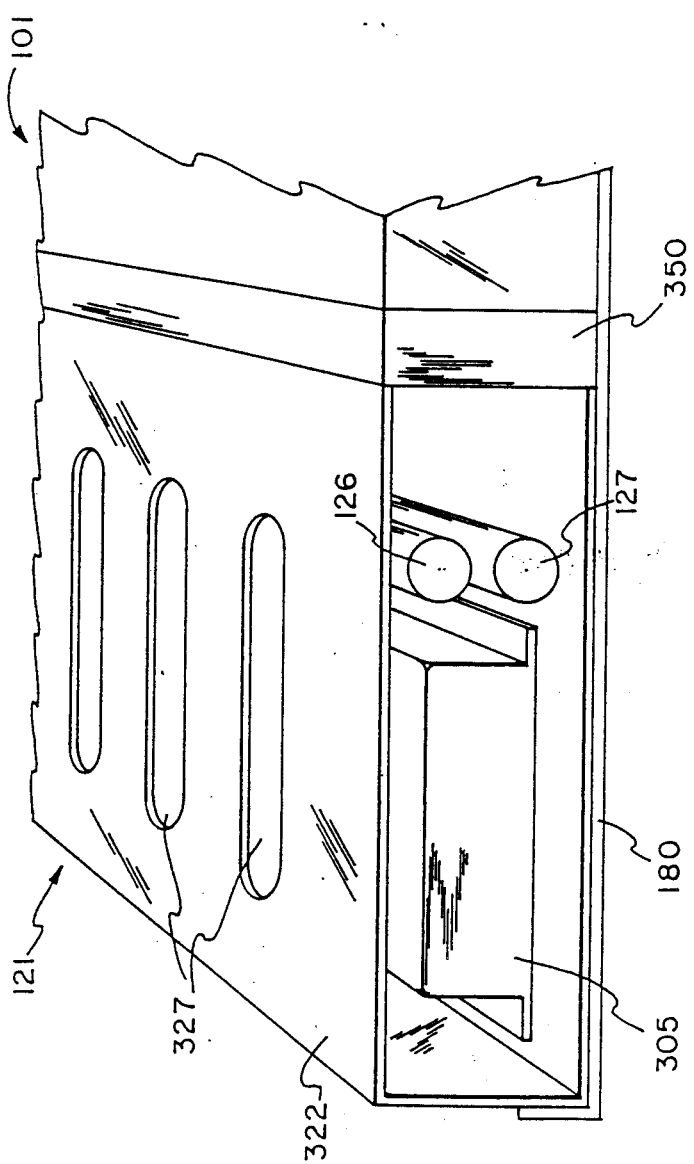
FIG. 3 is a partially broken away view of another embodiment in accordance with the invention.

FIG. 3 illustrates a further embodiment of the light generating subsystem 121. A housing 322 is provided, as in the previous embodiment, and includes fluorescent lamps 126 and 127. The ballast for these lamps is shown at 305. The housing 322 has vents 327 across the top surface thereof. In this embodiment, a transparent plastic panel 350 serves as a thermal barrier which insulates the light generating subsystem 121 from the light presenting subsystem 130. A base 180 is shown as in the prior embodiment. However, instead of a base, clamps or other suitable means can be utilized to join the subsystem 121, the plastic panel 350, and the subsystem 101.

The invention has been described with reference to a particular preferred embodiment, but variations within the spirit and scope of the invention will occur to those skilled in the art. For example, it will be understood that the invention has applications to other types of acoustic digitizers wherein, for example, acoustic energy is received at the movable element, or where the moveable element is passive (e.g. a material which reflects acoustic energy or even a finger), with the acoustic energy being generated at a separate source. Also, it will be understood that the invention has application to other light box configurations which utilize other types of thermal insulation for maintaining a cool light presenting subsystem.

We claim:

1. Apparatus for digitizing positions on a transparency, comprising:

a light box including a light generating subsystem and a light presenting subsystem, said light presenting system including means for receiving the light generated by said light generating subsystem, a translucent top working surface on which said transparency can be disposed, and means for distributing the received light such that it is emitted substantially uniformly from said top working surface;

means for thermally insulating said light presenting subsystem from said light generating subsystem to reduce heating of said working surface by said light generating subsystem;

an acoustic digitizer mounted in conjunction with said light box, and having a digitizing area over said working surface, said acoustic digitizer comprising an element movable in the region above said working surface, and means for determining the position of the moveable element by measuring the travel time of acoustic energy between said movable element and known locations.

2. Apparatus as defined by claim 1, wherein said means for thermally insulating said light presentation subsystem from said light generating subsystem comprises an air gap between said subsystems.

3. Apparatus as defined by claim 1, wherein said means for thermally insulating said light presentation subsystem comprises a plastic panel between said subsystems.

4. Apparatus as defined by claim 1, wherein said light presenting subsystem comprises a sealed enclosure having a transparent window for receiving light from the light generating subsystem, and total internal reflection material in said enclosure for distributing light within said enclosure.

5. Apparatus as defined by claim 2, wherein said light presenting subsystem comprises a sealed enclosure having a transparent window for receiving light from the light generating subsystem, and total internal reflection material in said enclosure for distributing light within said enclosure.

6. Apparatus as defined by claim 3, wherein said light presenting subsystem comprises a sealed enclosure having a transparent window for receiving light from the light generating subsystem, and total internal reflection material in said enclosure for distributing light within said enclosure.

7. Apparatus as defined by claim 2, wherein said light generating subsystem comprises a housing containing a light source, and having an opened side which faces and is spaced from the transparent window of said light presenting subsystem.

8. Apparatus as defined by claim 5, wherein said light generating subsystem comprises a housing containing a light source, and having an opened side which faces and is spaced from the transparent window of said light presenting subsystem 9. Apparatus as defined by claim 2, wherein said light generating subsystem is vented over said air gap.

10. Apparatus as defined by claim 3, wherein said light generating subsystem is vented.

11. Apparatus as defined by claim 1, wherein said acoustic digitizer movable element includes a source of acoustic energy, and wherein said position determining means includes a pair of spaced apart microphones positioned to receive said acoustic energy.

12. Apparatus as defined by claim 2, wherein said acoustic digitizer movable element includes a source of acoustic energy, and wherein said position determining means includes a pair of spaced apart microphones positioned to receive said acoustic energy.

13. Apparatus as defined by claim 3, wherein said acoustic digitizer movable element includes a source of acoustic energy, and wherein said position determining means includes a pair of spaced apart microphones positioned to receive said acoustic energy.

14. Apparatus as defined by claim 4, wherein said acoustic digitizer movable element includes a source of acoustic energy, and wherein said position determining means includes a pair of spaced apart microphones positioned to receive said acoustic energy.

15. Apparatus as defined by claim 5, wherein said acoustic digitizer movable element includes a source of acoustic energy, and wherein said position determining means includes a pair of spaced apart microphones positioned to receive said acoustic energy.

16. Apparatus as defined by claim 11, wherein said acoustic energy is transmitted through the air in the region above said working surface.

17. Apparatus as defined by claim 14, wherein said acoustic energy is transmitted through the air in the region above said working surface.

* * * * *